United States Patent
Angelino et al.

(10) Patent No.: US 10,936,211 B2
(45) Date of Patent: Mar. 2, 2021

(54) OPTIMIZED STORAGE PROTECTION

(71) Applicant: ARM IP LTD, Cambridge (GB)

(72) Inventors: Alessandro Angelino, London (GB);
Milosch Meriac, Cambridge (GB);
Niklas Lennart Hauser, Cambridge (GB)

(73) Assignee: ARM IP LTD, Cambridge (GB)

( * ) Notice: Subject to any disclaimer, the term of this patent is extended or adjusted under 35 U.S.C. 154(b) by 1 day.

(21) Appl. No.: 15/697,562

(22) Filed: Sep. 7, 2017

(65) Prior Publication Data

US 2019/0073145 A1    Mar. 7, 2019

(51) Int. Cl.
*G06F 3/06* (2006.01)
*G06F 12/14* (2006.01)
*G06F 21/57* (2013.01)

(52) U.S. Cl.
CPC .......... *G06F 3/0622* (2013.01); *G06F 3/0631* (2013.01); *G06F 3/0673* (2013.01); *G06F 12/14* (2013.01); *G06F 21/575* (2013.01)

(58) Field of Classification Search
CPC .... G06F 12/14; G06F 12/145; G06F 12/1491; G06F 2009/45583; G06F 2009/45587; G06F 21/566; G06F 21/604; G06F 2212/1052; G06F 3/0622; G06F 3/0631; G06F 3/0673
See application file for complete search history.

(56) References Cited

U.S. PATENT DOCUMENTS

| | | | | |
|---|---|---|---|---|
| 2005/0114616 A1* | 5/2005 | Tune | .................. | G06F 12/1441 711/163 |
| 2014/0115656 A1* | 4/2014 | Kim | .................. | G06F 21/604 726/1 |
| 2014/0223052 A1* | 8/2014 | Chavali | .............. | G06F 13/1605 710/110 |
| 2016/0188244 A1* | 6/2016 | Yang | .................. | G06F 3/0644 711/163 |
| 2017/0262383 A1* | 9/2017 | Lee | .................. | G06F 12/1425 |
| 2018/0267726 A1* | 9/2018 | Sun | .................. | G06F 3/0622 |

* cited by examiner

*Primary Examiner* — Zhuo H Li
(74) *Attorney, Agent, or Firm* — Leveque Intellectual Property Law, P.C.

(57) ABSTRACT

There is described a method, data processing apparatus and computer program product for initializing storage protection, the storage protection for enforcing access permission for a region of storage configured in a layout of regions according to at least one security constraint, the method comprising: receiving a set of storage requirements; generating a layout whereby the layout comprises a combination of storage regions that accommodate the storage requirements within the at least one security constraint; and configuring the storage protection according to the generated layout, wherein generating a layout comprises: calculating, for each storage requirement, a list of all storage regions that could accommodate the storage requirement within the at least one security constraint; selecting and testing combinations of storage regions until a selected combination accommodates the storage requirements within the at least one security constraint; and providing the accommodated combination of storage regions as a region layout.

21 Claims, 5 Drawing Sheets

OPTIMIZED STORAGE PROTECTION

BACKGROUND

An MPU is a programmable unit in a processing system that controls memory space access for processes by defining memory access permissions and memory attributes for different regions within memory space. All memory access is monitored by the MPU which can stop unauthorized access is attempted. The MPU adds robustness to embedded systems. It can prevent stack overflows in one task from corrupting memory belonging to another task. It can define regions of memory where access is never allowed by instruction fetches, thus preventing any potential malicious code from being executed from those regions. It can secure regions of random access memory from accidental corruption by defining those regions as read-only. It can also define regions of memory as shareable when multiple masters in the system have access to that region. By being shareable, the system is required to ensure coherency for that region among its masters.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements. Embodiments will be described with reference to the accompanying figures of which.

DETAILED DESCRIPTION

The present techniques relate to optimizing storage protection for system memory. In particular, the present techniques relate to optimizing the storage protection of a memory protection unit (MPU) in or part of a processing system.

According to a first technique, there is provided a method of initializing storage protection, the storage protection for enforcing access permission for a region of storage configured in a layout of regions according to a security constraint, the method comprising: receiving storage requirements; generating a region layout whereby the region layout comprises an arrangement of storage regions that accommodate the storage requirements within the security constraint; and configuring the storage protection according to the generated region layout.

According to a second technique, there is provided a memory protection initializer for configuring storage protection, the storage protection for enforcing access permission for a region of storage configured in a layout of regions according to a security constraint, the memory protection initializer comprising: a register for receiving storage requirements; a layout generator for generating a layout whereby the layout comprises a combination of storage regions that accommodate the storage requirements within the security constraint; and a layout selector for configuring the storage protection according to the generated layout.

According to a third technique, there is provided a computer program product for initializing storage protection, the storage protection for enforcing access permission for a region of storage configured in a layout of regions according to a security constraint, the computer program product comprising a computer readable storage medium having program instructions embodied therewith, the program instructions executable by a processor to cause the processor to: receive storage requirements; generate a region layout whereby the region layout comprises an arrangement of storage regions that accommodate the storage requirements within the security constraint; and configure the storage protection according to the generated region layout.

Figure 1:
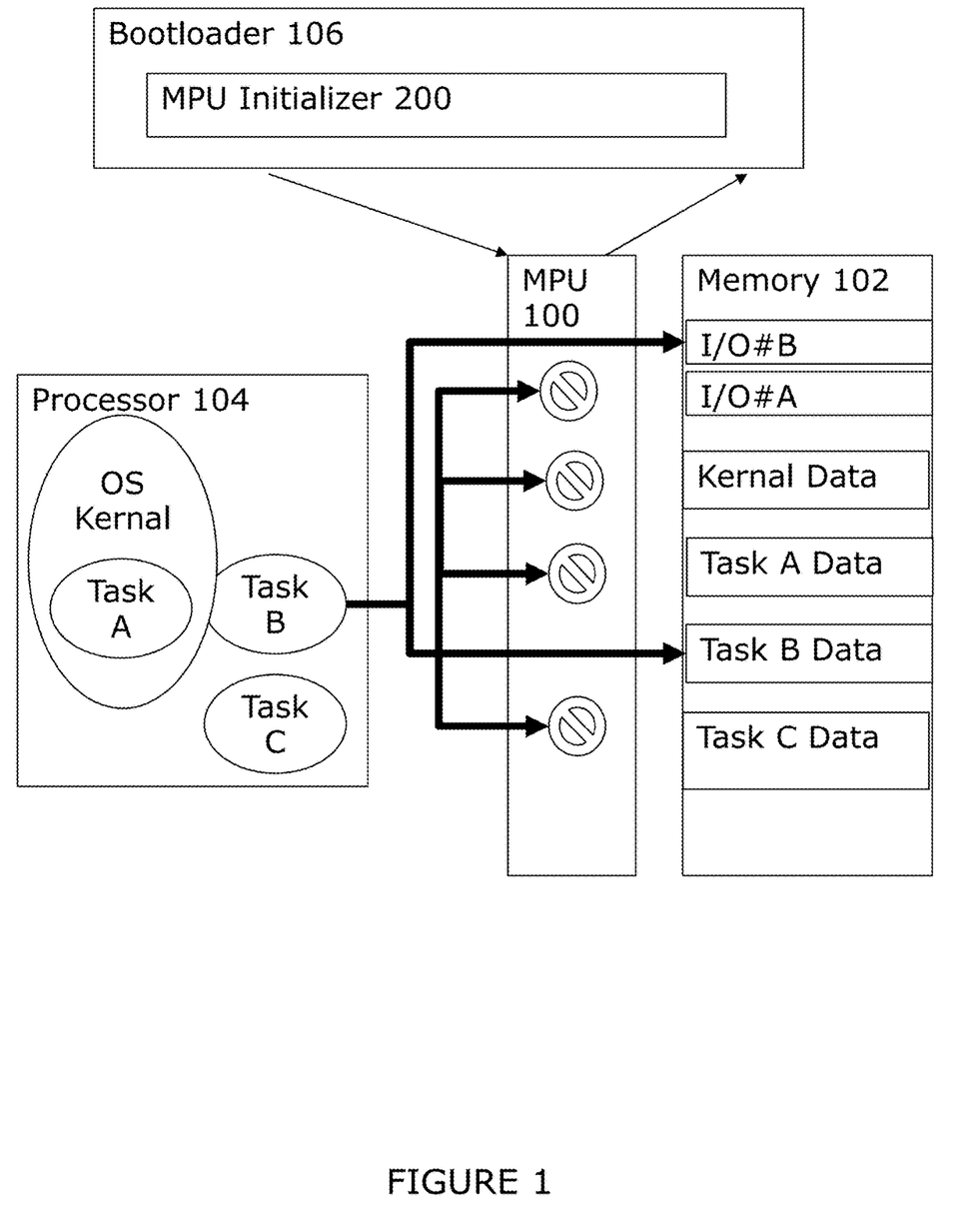
FIG. 1 is a deployment diagram for a preferred embodiment.

Referring to FIG. 1, an illustrative deployment of the embodiment comprises: a memory protection unit (MPU) 100, memory 102, a processor 104, and bootloader 106. A configuration of processor 104, memory 102 and MPU 100 is an option in Arm v7-M system architecture. MPU 100 allows the creation of regions within memory 102 where different access permissions are enforced for processor 104 tasks. For instance, the OS kernel has privileged access to areas designated for the OS kernel. Task A is a service running for the OS kernel and has access to OS kernel designated memory regions. However, task B is not running under the OS kernel (for instance it may be a service for an application) and is not allowed to access the regions designated for the OS kernel. Similarly, task C is not running under the OS kernel (for instance it may be a service for an application) and is not allowed to access the regions designated for the OS kernel. Some MPU regions have constraints on how they can be configured. For instance, in Arm v7-M system architecture, the start address of an MPU region must be aligned to a multiple of its size and the size of an MPU region must be in turn a power of two. Arm is a registered trademark of Arm Limited (or its subsidiaries) in the US and/or elsewhere.

Bootloader 106 is initialized when processor 104 is turned on and one of the setup processes is MPU initializer 200. Bootloader 106 may be a hypervisor and processor 104 can be a physical processor or virtual processor.

Figure 2:
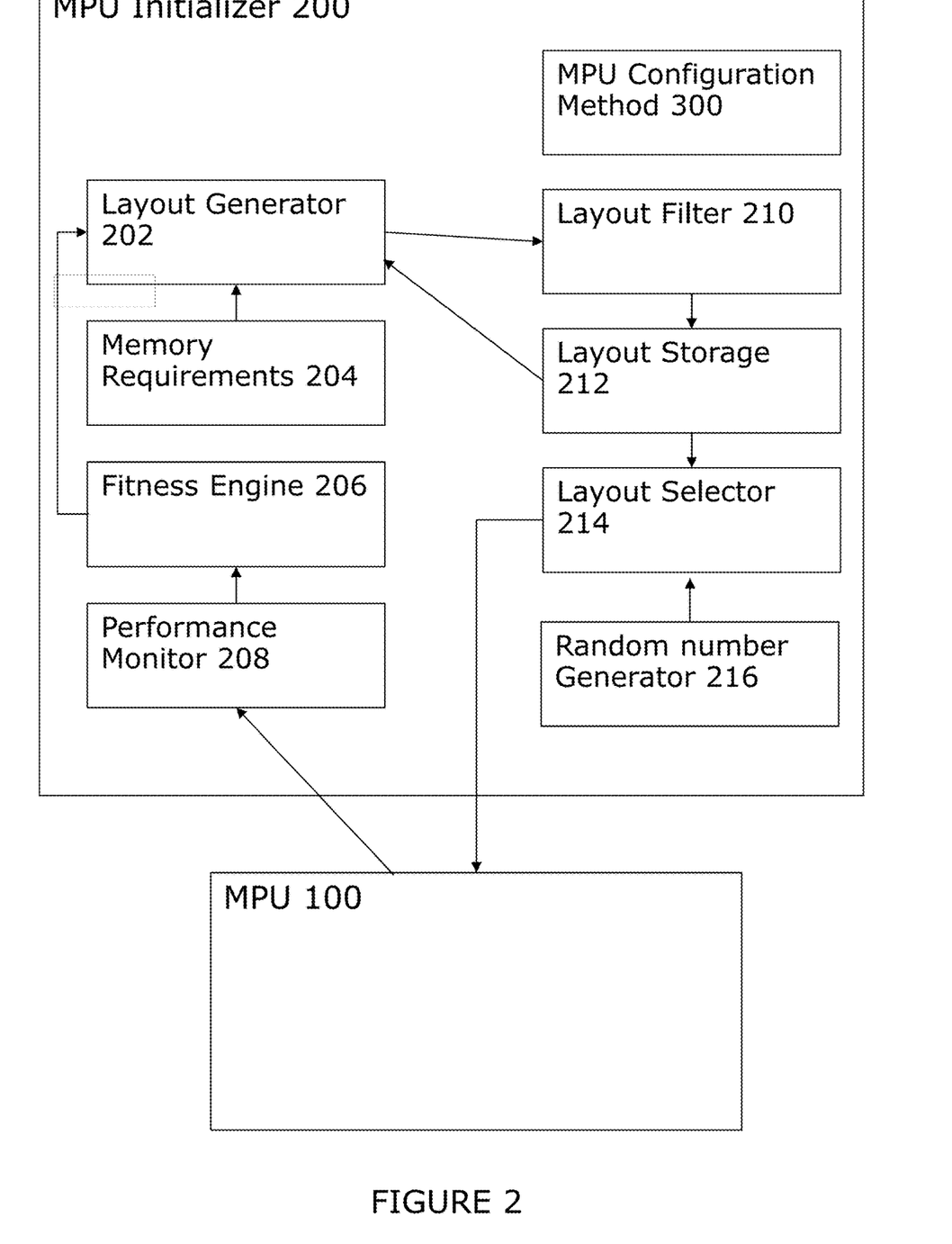
FIG. 2 is a component diagram for the preferred embodiment.

MPU initializer 200 is for configuring MPU 100 to enable regions to conform to the requirements. MPU regions are meant to cover large portions of memory to compartmentalize an application statically. In some applications, though, advanced use is made of such a feature to enforce mutually distrustful secure domains. When this is the case, the alignment requirements can become restrictive to a point where memory use is highly over-inflated and overall usability is compromised.

For example, an MPU is used to create three secure regions in SRAM (start address: 0x20000000). Each region must be granted an MPU region. Region 1 is 5 KB (8 KB rounded up to nearest power of two) and starts at 0x20000000; region 2 is 10 KB (16 KB rounded up to nearest power of two) and starts at 0x20004000; and region 3 is 17 KB (32 KB rounded up to nearest power of two) and starts at 0x20008000. The three regions would account for a total of 32 KB, but because of size restrictions (rounding up to nearest power of two), alignment restrictions (align to offset multiple of size), and optional ordering (no smart memory placement), the total used size is 64 KB, which is double the size used. KB represents 2^10 (1024) bytes and is known as a kibibyte (KiB).

Referring to FIG. 2, MPU initializer 200 comprises: layout generator 202; memory requirements 204; fitness engine 206; performance monitor 208; layout filter 210; layout storage 212; layout selector 214; random number generator 216 and MPU configuration method 300. MPU initializer 200 can operate as an a separate component or as part of a hypervisor or bootloader.

Layout generator 202 is for generating MPU region layouts.

Memory requirements 204 is for storing region requirements and security constraints.

Fitness engine 206 is for reporting on performance metrics of the MPU and configured layout.

Performance monitor 208 is for monitoring performance metrics in MPU 100 for a configured layout.

Layout filter 210 is for filtering the generated layouts using a filter criteria.

Layout storage 212 is for storing the filtered layouts and providing layouts to layout generator 202 and layout selector 214.

Layout selector 214 is for selecting a layout according to a selection criteria and configuring MPU 100 with the selected layout.

Random number generator 216 is for supplying a random number to layout selector 214 and/or layout filter 210 when the selection criteria and/or filter criteria is for a random selection and/or filtering. Without randomness, a valid layout is stored with a certain likelihood during enumeration of all valid layouts. Using true random number generation (TRNG) or pseudo random number generation (PRNG) renders layout selection and filtering unpredictable to an attacker.

For higher security, MPU 100 can (regularly or irregularly) reboot to switch between different stored valid region configurations.

To simplify debugging of the MPU 100, pseudo-randomly generated seed values are used to generate region configurations. The MPU can inform a remote user of the seed value to enable them to calculate the corresponding region configuration of the device to understand crash-dumps and to adjust/enrich debug information with memory ownership. By randomly picking seed values rather than iterating linearly through the solution space, all devices end up having a distinct subset of region configuration (assuming the total solution space is large enough). Having the generator seed value removes the need to communicate the whole region configuration array. The region configuration can be recreated by the remote party by knowing the available memories, the seed value and the required region sizes. The required region sizes are usually part of the firmware image (for example a hypervisor configuration structure) and can be detected by introspecting the firmware image for hypervisor metadata.

Figure 3:
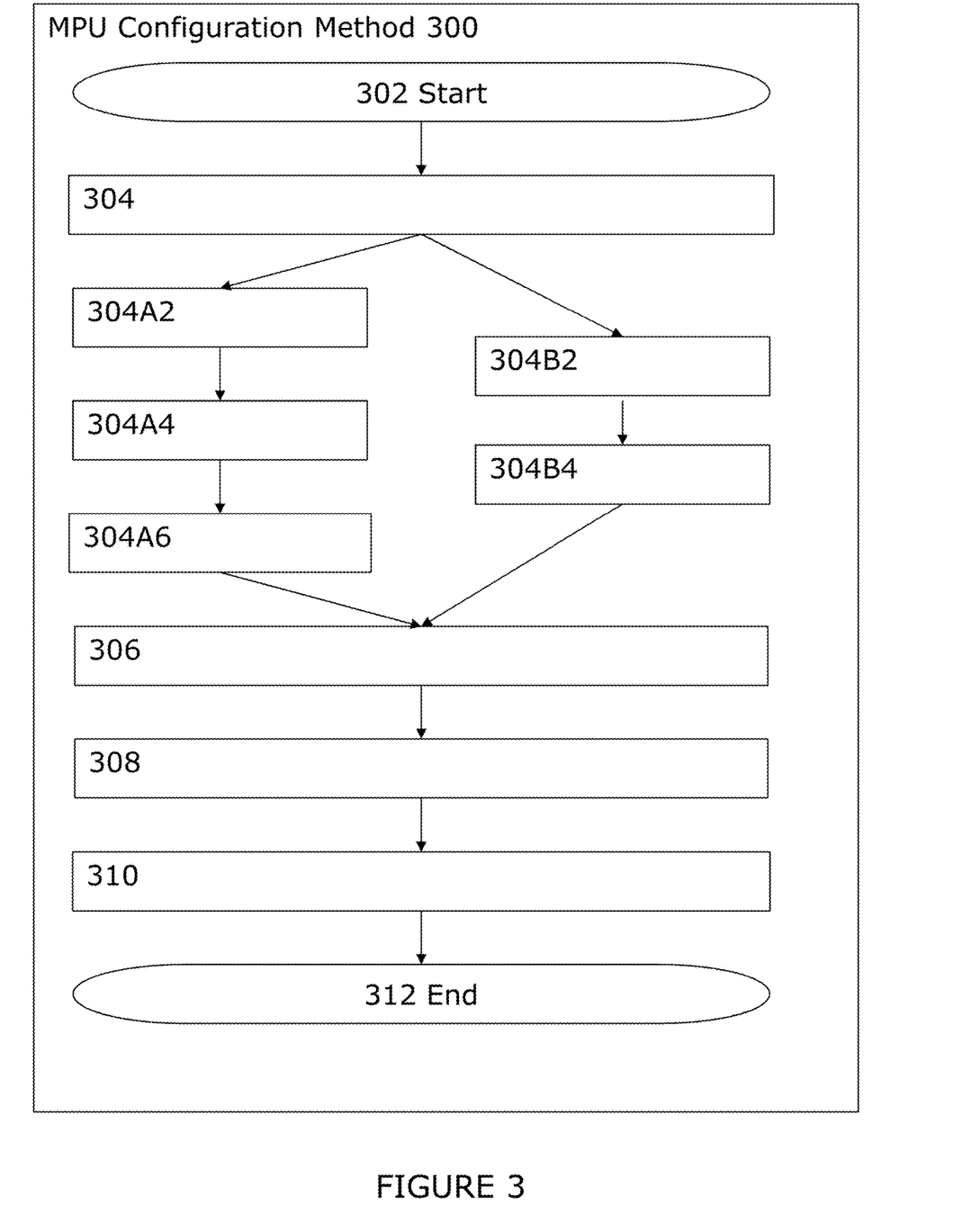
FIG. 3 is a method diagram according to the preferred embodiment.

MPU configuration method 300 is for co-ordinating MPU initializer 200 and is described in detail later.

The embodiments provide a way of arranging secure domains memories in a way that: minimizes the memory wastage, still meeting the MPU requirements; increases the overall security between the secure domains to reduce memory-layout/address-based exploits; and allows merging of areas with identical access permissions.

Three phases of MPU initializer 200 are now described followed by a functional description of the individual steps of MPU configuration method 300. MPU initializer 200, given a list of secure domains and an amount of memory allocated for each domain, undergoes each phase (phase1; phase 2 and phase 3) at initialization time.

In phase 1, all secure domains are enumerated.

In phase 2, a list of all possible MPU domains that can be used to cover the regions assigned to every secure domain is generated, then a list of all possible layouts where such MPU regions can be distributed is generated. MPU regions on some architecture can be divided into sub-regions, by which a region can effectively be made to span a subset of the original region size, with a granularity equal to ⅛th of the region size. In phase 2, all the possible MPU regions and sub-regions that can accommodate the required layout may be calculated.

In phase 3, the best possible layout is chosen based on the criteria 3A or 3B. Criteria 3A is for memory-constrained devices whereby the layout that minimizes memory wastage is chosen. Criteria 3B is for increased security whereby a compromise between memory waste and layout randomization is chosen. While criteria 3A ensures maximum memory optimization, which is paramount for memory-constrained devices, criteria 3B allows additional security measures 3B1 to 3B5. In each memory region: a stack, a heap, a BSS section for a domain, or a combination of these, or a combination of those sections but coming from different secure domains is placed (3B1). The distributions of these regions is randomized to prevent memory-address-based exploits (3B2). MPU regions can be configured to only span a subset of the 8 sub-regions they provide and this optimizes memory consumption (3B3). Memory sections can be separated by an empty sub-region to ensure that overflows or underflows result in memory exceptions (3B4). Some systems specifically allow assignment of dynamical addresses to global box variables which can be randomised too (3B5).

The best or a set of the best layouts can be stored in layout storage 212 and kept across reboots. In this way, the layout algorithm is only executed once. For increased security, MPU initializer 200 can regenerate such configurations at every reboot, randomizing the secure domains' sections layout. If known working configurations can be retrieved from the configuration storage, the task is simplified to picking a random layout for that set. For example, this means that secure domains get a different stack pointer, heap base at every reboot. In addition to this, if secure domains are plug-and-play, they can be selectively rebooted with a different stack pointer and/or heap pointer assigned to them. A secure domain can also allocate more memory than it actually requires and use the additional memory to randomly assign the initial stack/heap pointer within that range. This can be done at every boot. Any operating system that uses a constrained MPU will, or may, make use of this solution.

Referring to FIG. 3, storage protection initialization method 300 is described with respect to logical process steps 302 to 320. Storage protection is a method or system for enforcing an access permission policy for a region of storage configured in a layout of one or more regions according to at least one security constraint. Storage protection initialization is for configuring a layout of one or more regions and associated access permission policies for a storage protection method or system.

Step 302 is the start of method 300 and is for receiving a set of storage requirements for the layout and at least one security constraint when storage protection is to be initialized. A set of storage requirements comprises in one example a list of one or more memory domains to be used as regions in the layout. The at least one security constraint comprises, for example, a restriction on region alignment. In an example (see also FIGS. 4A and 4B), the start address of a region must be aligned to a multiple of its size. When sub-regions are enabled then the start of address of a sub-region must be aligned to a multiple of it size. Each region (as long as it is at least 256 bytes) is sub-divided into 8 sub-regions with an enable bit for each individual sub-region. Constraints are particular for a particular design of MPU.

In the preferred embodiment, the storage protection initialization is activated by a bootloader or a hypervisor before the associated data processing system is operating and using the protected storage. However, other embodiments are envisaged where a data processing system using the protected storage (or any other runtime environment whether or not it uses the protected storage) can activate the storage protection initialization method.

Step 304 is for generating, for the set of storage requirements, one or more storage region layouts whereby a storage region layout comprises a configuration of solution regions that accommodate the storage requirements within the at least one security constraint. In the preferred embodiment, there are two sub-methods of providing a storage region layout: 304A algorithmic generation (304A2 to 304A6) of a storage region layout; or 304B loading a previously generated and stored storage region layout (304B2 to 304B4). Generally, if previously stored layouts are located then this will be used (steps 304B2 to 304B4) otherwise new layouts are generated (steps 304A2 to 304A6).

Step 304A2 is for generating, for each storage requirement, a list of all storage regions that could accommodate the storage requirement within the at least one security constraint. In the preferred embodiment, a region is non-divisible. In a sub-region embodiment, each storage region includes storage sub-regions and each list of storage regions is a list of storage sub-regions and each storage layout comprises a co-operating set of storage sub-regions accommodating the set of domains within the storage sub-region. Next step 304A4.

Step 304A4 is for generating, for the set of storage requirements, at least one region layout whereby each region layout comprises a solution of storage regions accommodating the storage requirements within the at least one security constraint. The mathematical problem related to this is a NP computational hard problem called "bin packing" that can be solved using known algorithms including heuristics. In the embodiments and examples a first-fit algorithm is used and described. In the sub-region embodiment, step 304A4 is for generating, for the set of storage requirements, at least one region layout whereby each region layout comprises a solution of storage sub-regions accommodating the storage requirements within the at least one security constraint. Next step 304A6.

Step 304A6 is for saving the generated at least one region layout and associated set of storage requirements in pervasive storage. Next step 306.

Step 304B2 is for loading region layouts, that are associated with the received storage requirements and security constraint, from pervasive storage. Next step 304B4.

Step 304B4 is for loading saved performance values associated with the loaded region layouts when they exist. Next step 306.

Step 306 is for validating that a layout conforms to a selection criteria and/or for selecting a layout from two or more layouts that best conform to the selection criteria. The selection criteria can comprise selecting the layout that minimizes storage wastage and/or the selection criteria comprises selecting a randomized layout. The selection criteria is performance related when a performance value is associated with a loaded layout. Next step 308.

Step 308 is for configuring the storage protection according to the validated and/or selected layout. Next step 310.

Step 310 is for locating a performance value for the storage protection configured according to the selected of the region layout and saving the located performance value with a saved region layout whereby a region layout can be loaded or selected based on an associated saved performance value. Next step 312.

Step 312 is the end of storage protection initialization method 300.

Figure 4A:
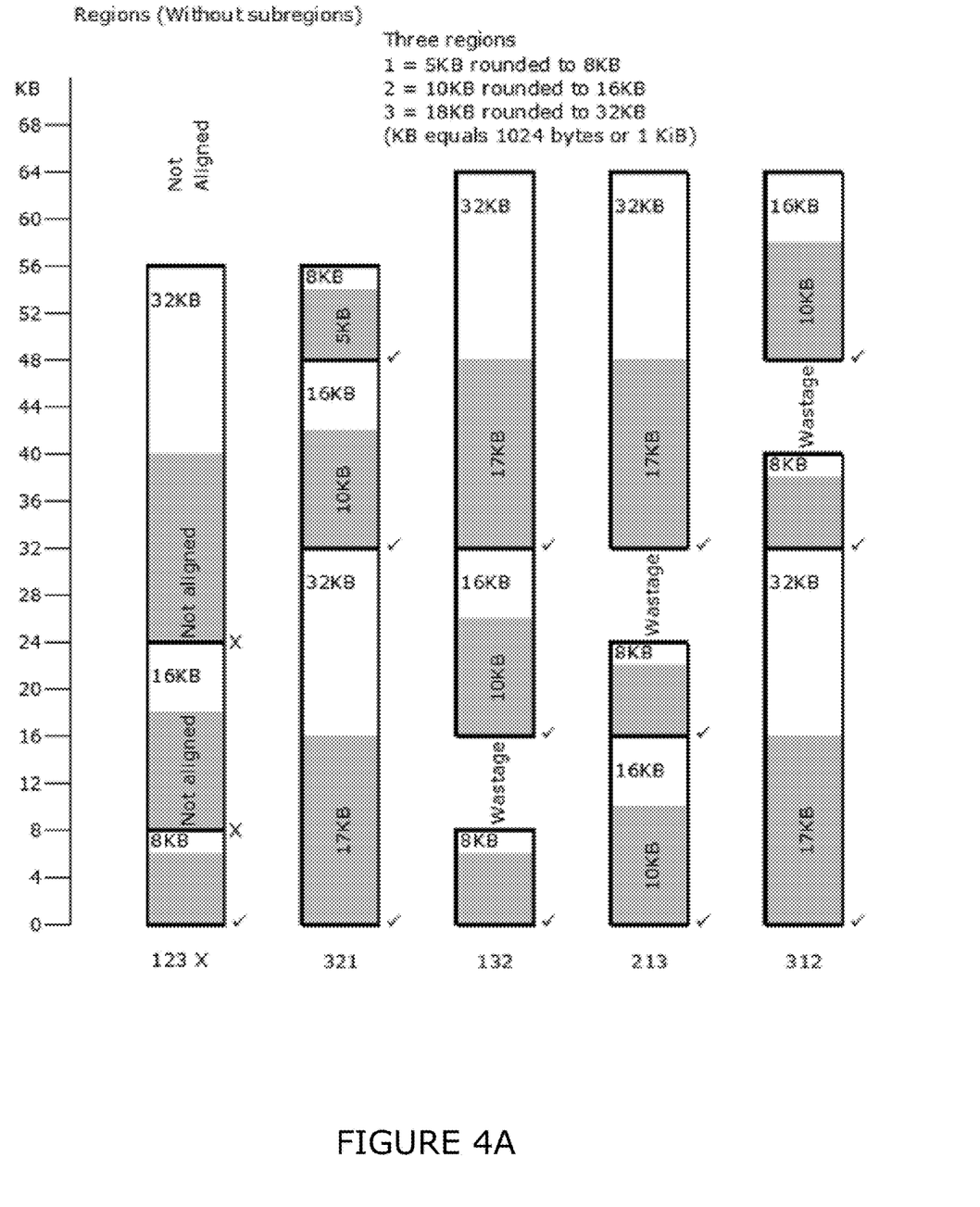
FIGS. 4A and 4B are schematic examples of the embodiment.
Figure 4B:
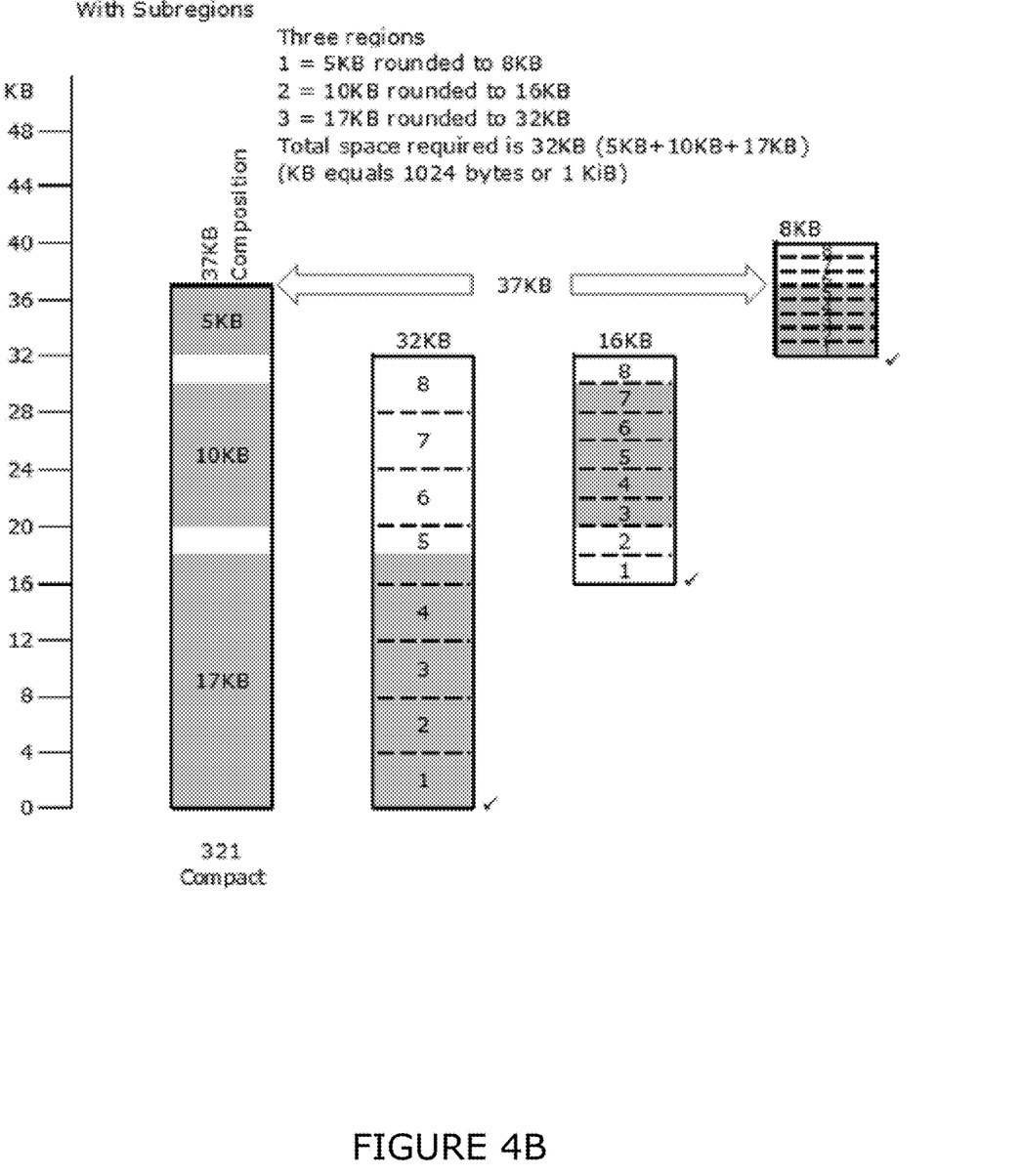

Referring to FIG. 4A (sub-regions are not enabled) and FIG. 4B (sub-regions are enabled), the operation of the preferred embodiment is described with respect to an example comprising three regions: region 1 requires 5 KB of memory which rounds to 8 KB under a rounding constraint; region 2 requires 10 KB which rounds to 16 KB under the constraint; and region 3 requires 17 KB which rounds to 32 KB constraint.

Referring to FIG. 4A, for the three regions 1, 2 and 3, five of the six non-repeating permutations are shown as full regions: 123, 321, 132, 213 and 312. Valid MPU region layouts_not_ using sub-regions can be generated by a first-fit algorithm. Round all memory size requirements to the nearest power-of-two size. For all permutations of regions, find the first free space that: fits the entire region; aligns start address of the region correctly; and does not overlap with any other enabled regions. It can be seen that the 16 KB region for permutation 123 is aligned on an 8 KB boundary and therefore not aligned to a multiple of its size (16 KB), therefore this region is not correctly aligned. The remaining examples permutations 321, 123, 213 and 312 are all correctly aligned to a start address offset that is a multiple of the region size.

Referring to FIG. 4B, valid MPU region layouts using sub-regions can be generated by a slightly modified algorithm for rounding all memory size requirements to the nearest power-of-two size. The modified algorithm is also for choosing the smallest number of sub-regions to cover all requested memory. The modified algorithm is further, for all permutations of sub-region positions, for locating the first free space that: fits the entire slice of sub-regions; aligns start address of the region correctly; and does not overlap with any other enabled sub-regions.

This method of region layout generation and may generate very large permutations (for instance 8 regions generates 8!=40320 sets). Evaluating all these sets is within the capability of the processor to first sort the regions by decreasing size and then perform the first-fit algorithm.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

The invention claimed is:

1. A method of initializing storage protection, the storage protection for enforcing access permission for a region of storage configured in a layout of regions according to a security constraint, the method comprising:
    receiving the security constraint, the security constraint having a restriction on region alignment, a restriction on region size, and a restriction on overlapping regions;
    receiving storage requirements, the storage requirements having one or more domains in storage to be used as storage regions;
    identifying, for each storage requirement, the storage regions in the storage that accommodate the respective storage requirement within the security constraint;
    generating a plurality of region layouts, each region layout having a non-repeating permutation of the identified storage regions;
    selecting a selected region layout from among the generated region layouts to accommodate the storage requirements within the security constraint; and
    configuring the storage protection according to the selected region layout.

2. A method according to claim 1, the selecting a selected region layout further comprising:
    calculating, for each storage requirement, storage region non-repeating permutations that accommodate the storage requirements;
    testing each storage region non-repeating permutation until a tested storage region non-repeating permutation is located that satisfies the security constraint; and
    providing the located storage region non-repeating permutation as a selected region layout.

3. A method according to claim 2, further comprising saving, in persistent storage for future use, the selected region layout, associated storage requirements and associated security constraint.

4. A method according to claim 2, further comprising locating a performance value for the storage protection configured according to the selected region layout and associating the performance value with the saved selected region layout, a selected region layout selected based on an associated performance value.

5. A method according to claim 1, and where each storage region comprises storage sub-regions and where the region layout comprises an arrangement of storage regions with associated sub-regions that accommodate the storage requirements within the security constraint; and
    configuring the storage protection according to the selected region layout.

6. A method according to claim 1, where selecting a region layout further comprises loading a region layout associated with the received storage requirements from pervasive storage.

7. A method according to claim 1, further comprising generating two or more region layouts; selecting one region layout according to selection criteria; and configuring the storage protection according to the selected region layout.

8. A method according to claim 7, wherein the selection criteria further comprising selecting the region layout that minimizes storage wastage.

9. A method according to claim 7, wherein the selection criteria further comprises selecting a random layout from the two or more generated region layouts.

10. A method according to claim 9, where the random layout is a true random layout.

11. A method according to claim 9, where the random layout is a pseudo random layout generated from a seed value.

12. A method according to claim 7, where the selection criteria comprises selecting a combination of randomized layout and minimized storage wastage.

13. A method according to claim 1, where the security constraint is that one or more regions are constrained by distance to the next active region.

14. A method according to claim 1, further comprising validating that the selected region layout conforms to a selection criteria before configuring storage protection.

15. A method according to claim 1, where the method is activated by a runtime environment.

16. A memory protection initializer for configuring storage protection, the storage protection for enforcing access permission for a region of storage configured in a layout of regions according to a security constraint, the memory protection initializer comprising:

storage for receiving the security constraint, the security constraint having a restriction on region alignment, a restriction on region size, and a restriction on overlapping regions;

storage for receiving storage requirements, the storage requirements having one or more domains in storage to be used as storage regions;

a layout filter for identifying, for each storage requirement, the storage regions in the storage that accommodate the respective storage requirement within the security constraint;

a layout generator for generating a plurality of region layouts, each region layout comprising a non-repeating permutation of one or more of the identified storage regions to accommodate the storage requirements within the security constraint; and a layout selector for selecting a selected region layout from among the generated region layouts and configuring the storage protection according to the selected region layout.

17. A memory protection initializer according to claim 16, where the layout generator further:

calculates, for each storage requirement, storage region non-repeating permutations that accommodate the storage requirements;

tests each storage region non-repeating permutation until a tested storage region non-repeating permutation is located that satisfies the security constraint; and provides the located storage region non-repeating permutation as a selected region layout.

18. A memory protection initializer according to claim 16, further comprising locating a performance value for the storage protection configured according to the selected region layout and saving the located performance value with a saved region layout, where a region layout can be loaded or selected based on an associated saved performance value.

19. A memory protection initializer according to claim 16, each storage region further comprising storage sub-regions and the region layout further comprising an arrangement of storage regions with associated sub-regions that accommodate the storage requirements within the security constraint; and configuring the storage protection according to the selected region layout.

20. A non-transitory computer readable storage medium comprising a computer program product for initializing storage protection, the storage protection for enforcing access permission for a region of storage configured in a layout of regions according to a security constraint, the computer program product comprising a computer readable storage medium having program instructions embodied therewith, the program instructions executable by a processor to cause the processor to:

receive the security constraint, the security constraint having a restriction on region alignment, a restriction on region size, and a restriction on overlapping regions;

receive storage requirements, the storage requirements having one or more domains in storage to be used as storage regions;

identify, for each storage requirement, the storage regions in the storage that accommodate the respective storage requirement within the security constraint;

generate a plurality of region layouts, each region layout having a non-repeating permutation of the identified storage regions;

select a selected region layout from among the generated region layouts to accommodate the storage requirements within the security constraint; and configure the storage protection according to the selected region layout.

21. A non-transitory computer readable storage medium comprising a computer program product according to claim 20 further comprising program instructions executable by the processor to cause the processor to generate the region layout comprising:

calculate, for each storage requirement, storage region arrangements that accommodate the storage requirements;

test each storage region non-repeating permutation until a tested storage region non-repeating permutation is located that satisfies the security constraint; and provide the located storage region arrangement as a selected region layout.

* * * * *